UNITED STATES PATENT OFFICE.

FRANCIS L. STEWART, OF MURRYSVILLE, PENNSYLVANIA, ASSIGNOR OF ONE-HALF TO SAMUEL E. GILL, OF PITTSBURG, PENNSYLVANIA.

UTILIZATION OF EARS OF MAIZE.

No. 922,822.     Specification of Letters Patent.     Patented May 25, 1909.

Application filed March 11, 1907, Serial No. 361,654. Renewed October 19, 1908. Serial No. 458,488.

*To all whom it may concern:*

Be it known that I, FRANCIS L. STEWART, of Murrysville, Westmoreland county, Pennsylvania, have invented a new and useful Improvement in the Utilization of Ears of Maize, of which the following is a full clear, and exact description.

My invention relates to the obtaining of commercial products from corn, particularly maize or Indian corn.

I have discovered that by removing the ear while in the milk, or at the time specified in my U. S. Letters Patent No. 811,523 dated Jan. 30, 1906, and at the same time stripping with the green and immature ear the foot stalk and enveloping husks, I can obtain several improved commercial products. By removing the ears in this manner, and at this time, as stated in said patent, not only is the percentage of sugar in the remaining growing stalks largely increased during the further growing period, thus affording an improved commercial process for obtaining sugar; but at the same time the removed ears, together with their husks and foot stalks can be treated according to the present process, and several other improved products obtained.

In carrying out my process, I preferably proceed as follows:—The immature ears, husks and foot stalks, plucked at about the time when the ear is in the milk or the roasting period, are ground up or reduced to a fine pulp by any suitable machine. The ground material is then transferred into a heating tank or digester, together with about an equal volume of water strongly acidulated with either oxalic or sulfuric acid. Other mineral acids may be used for the same purpose, although I prefer the acids named. The mixture if introduced into an open heater, should then be heated for about two hours to a temperature of about 212° F.; and if introduced into a closed digester it is heated for about an hour under a pressure of about three atmospheres. It is then transferred into a percolating or draining tank, and after the fluid part has been run off the wet, pulpy matter is passed through a roller press or other machine capable of extracting the remainder of the liquid. This remaining liquid and the liquid part first run off are mixed together and passed into a tank, where it is treated with carbonate of lime if oxalic acid has been used in the previous acidification, or an alkali if another acid has been used, until just sufficient has been introduced to neutralize the acid or, if more rapid reactions are desired, to render the liquid slightly alkaline, as indicated by litmus or phenolphthalein test paper. By this treatment a precipitate is obtained from the liquid, which I have found to have peculiar valuable properties when used either in the form of a fine white precipitate thus produced, or when dried or dissolved in the different menstrua. The chemical composition of this precipitate has not as yet been fully determined, but it appears to consist largely of albuminous matter, which is first precipitated in the form of a white powder; and which can be preserved in proper condition only when dried, as described, or in the form of a solution in a proper solvent. Its uses are various; it is valuable as a food product, and one of the most important of its other uses is that when "paper stuff" is saturated with its solution in a weak acid, it is easily precipitable within the fiber of the paper by an alkali, and is permanently lodged there as a "filler" insoluble in water. The liquid containing the fermentable matter from which this precipitate is obtained is then racked off into a fermenting vat; and if the operation has been properly conducted will have a specific gravity of about 1.080 or a density of about 11° Baumé, and will be free from impurities, which would otherwise impede or hinder its fermentation. In the fermenting vat it is brought to the proper temperature, and then fermented and distilled as in the ordinary manufacture of alcohol. The alcohol thus produced will be equal in all respects to that made from other sources.

I make no claim herein to the method above described for obtaining the albuminous precipitate and alcohol, as it forms the subject-matter of my copending application, Ser. No. 397,577 filed October 15, 1907.

The press cake, or half-dried pulpy residuum, which is obtained from the mass after heating with water, is transferred into a vessel or tank fitted with a revolving stirrer and mixed with about twice its volume of cold water and enough of caustic soda or potash added to make the liquid strongly alkaline to litmus or turmeric test paper. After about half an hour, with constant stirring, the liquid part is drained and pressed out and run into another tank, where it is treated with oxalic, sulfurous or other suitable acid in sufficient quantity to bring it as closely as possible to a neutral condition, or even to render it slightly acid, as indicated by litmus paper. Another substance is then precipitated from this solution, which I have found to be very valuable for various uses, either as a food product for table use or for different uses in the arts in the form of solutions, one of which is its solution in alkali, as above named, before it has been precipitated by the acid. This precipitate being soluble in an alkaline liquid, can be used in the production of films and varnishes, and is precipitated by an acid from the alkaline solution; and may be dissolved again if it is necessary to further purify it. It is closely analogous to casein in its properties; and among its other uses it, also, can be employed as a "filler" in paper manufacture. Both this precipitate and the precipitate above mentioned have other important uses in the arts and these here mentioned are given as examples only.

The remaining pulpy product, from which the above named substances in solution have been extracted, consists of husk fiber and other cellular matter in a highly purified condition, which is readily capable of being converted by the process for which I obtained Letters Patent of the United States No. 811,524 into a superior grade of paper pulp or into any of the higher commercial cellulose products, the same as are obtained from cotton.

The advantages of my invention result from the discovery that these valuable products, namely, alcohol, pulp and cellulose, and the two precipitates above referred to, may be obtained from the field or Indian corn when the ear is plucked at about the time mentioned. These processes therefore provide for the obtaining of several valuable products from corn, where the stalk of the plant is to be treated in accordance with my patent above referred to for the production of sugar.

I claim:—

1. In the method of utilizing ears of maize, the steps which consist in pulping the immature ears and husks; heating the pulp with water; separating the pulp and solution; again stirring the pulp in an alkaline solution; separating the pulp and alkaline solution; and then separating a valuable precipitate from the alkaline solution.

2. In the method of utilizing ears of maize, the steps which consist in grinding the immature ears and husks, heating the ground mass with water; separating the liquid from the pulpy mass; again mixing the pulp with water and an alkali; separating the alkaline liquid and pulp; and then separating an organic precipitate from the liquid.

3. In the method of utilizing ears of maize, the steps which consist in grinding the immature ears and husks; heating the ground mass with water and an acid; separating the pulp and acid liquid; again mixing the pulp with water and an alkali; separating the alkaline liquid and pulp; again adding an acid to the alkaline liquid and thereby forming a precipitate; and then separating the precipitate from the liquid.

4. In the method of utilizing ears of maize, the steps which consist in plucking the ears while the kernel is in the milk; grinding the ears and husks; heating the ground mass with water and an acid; separating the pulp and acidulated liquid; again mixing the pulp with water and an alkali; separating the pulp and alkaline liquid; adding an acid to the alkaline liquid and thereby forming an organic precipitate; and then separating the precipitate from the liquid.

5. The method of utilizing ears of maize, which consists in grinding the immature ears and husks; heating the ground mass in an acid solution; separating the pulp and liquid; again mixing the pulp with an alkaline solution; separating the pulp from the solution for conversion into cellulose products; again adding acid to the solution and thereby throwing down a precipitate, and recovering the precipitate as a by-product.

6. The method of utilizing ears of maize, which consists in plucking them while the kernel is in the milk; pulping the ears and husks and heating the pulp with water and an acid; separating the pulp and solution; again mixing the pulp with water and an alkali; separating the pulp from the alkaline solution for conversion into cellulose products; adding acid to the alkaline solution and thereby throwing down an organic precipitate, and recovering the precipitate as a by-product.

In testimony whereof, I have hereunto set my hand.

FRANCIS L. STEWART.

Witnesses:
  GEO. B. BLEMING,
  JOHN MILLER.